United States Patent [19]

Nebu

[11] 4,422,659
[45] Dec. 27, 1983

[54] REAR FENDER STRUCTURE FOR MOTORCYCLES

[75] Inventor: Hideaki Nebu, Shiki, Japan

[73] Assignee: Honda Giken Kogyo Kabushiki Kaisha, Tokyo, Japan

[21] Appl. No.: 331,264

[22] Filed: Dec. 16, 1981

[30] Foreign Application Priority Data

Dec. 29, 1980 [JP] Japan .................................. 55-185423
Dec. 29, 1980 [JP] Japan ........................... 55-187958[U]

[51] Int. Cl.³ ............................................... B62B 9/16
[52] U.S. Cl. .................... 280/152.1; 180/219; 280/154.5 A; 296/1 C
[58] Field of Search ..................... 280/154.5 A, 152.1, 280/152.2, 152.3, 153 R, 154.5 R; 180/219; 296/1 C

[56] References Cited

U.S. PATENT DOCUMENTS 2,575,211 11/1951 Flacke ............................. 280/152 R
2,591,196 4/1952 Post ............................. 280/154.5 R

FOREIGN PATENT DOCUMENTS 482430 3/1938 United Kingdom ............. 280/152.1
629917 9/1949 United Kingdom ............. 280/152.1

Primary Examiner—Joseph F. Peters, Jr.
Assistant Examiner—Kenneth R. Rice
Attorney, Agent, or Firm—Lyon & Lyon

[57] ABSTRACT

A rear fender structure for a motorcycle having a frame comprises a fender body fixedly attached to the motorcycle frame and a fender member removably joined to the fender body to provide easy access for removal of the rear wheel. The fender body can be hingedly connected to mounting means fixedly supported by the frame such as a tail bracket. The fender body can be removably secured to the tail light bracket.

6 Claims, 5 Drawing Figures

REAR FENDER STRUCTURE FOR MOTORCYCLES

BACKGROUND

The present invention relates to rear fender structures for motorcycles.

When a rear tire is removed from a motorcycle, it has to be moved downwardly after it has been slightly moved rearwardly, because the rear fender is integrally mounted on the body frame. Downward movement of the rear tire can be accomplished by placing the rear tire over a depression in the ground. When this is done, the attaching or detaching of the rear tire can be performed relatively easily and efficiently.

However, usually the motorcycle body or frame has to be held in a raised position to remove the rear tire. This makes it very difficult to attach or detach the rear tire within a short amount of time.

FIG. 1 shows a rear portion of a conventional motorcycle 10. The motorcycle 10 has a rear fender 12 extending down below the top edge of its rear tire 14. The rear tire 14 is obstructed by the cross-hatched portion 16 of the rear fender 12, as shown in FIG. 1. Unless the motorcycle is leaned sidewards or unless the rear fender 12 is removed from the motorcycle frame, it is very difficult to attach or detach the rear tire 14. Moreover, the removal of the rear fender is so troublesome that the rear tire 14 cannot be efficiently detached in a short amount of time.

Therefore, there is a need for an improvement in the rear fender of a motorcycle which eliminates the difficulties with prior art rear fender structures. There is a need for motorcycle rear fender which can facilitate the attaching or detaching or a rear tire even if the motorcycle has a long rear fender.

SUMMARY

The present invention is directed to a rear fender structure for a motorcycle which has these features. The rear fender structure comprises a fender body fixedly attached to the motorcycle frame and a fender member removably joined to the fender body. The fender member can be hingedly connected to mounting means fixedly supported by the frame. The mounting means can be a tail light bracket and the hinge connection can be achieved by a mounting bracket that is integrally formed with a license plate holder. To insure that the rear wheel can easily be removed or attached, the lower edge of the fender body is above the elevation of the uppermost outer circumference of the rear tire of the motorcycle when the tire is to be replaced.

The removable fender member can be removably secured to the tail light bracket.

DRAWINGS

These and other features, aspects, and advantages of the present invention will become better understood with reference to the following description, appended claims, and accompanying drawings where:

DESCRIPTION

Figure 2:
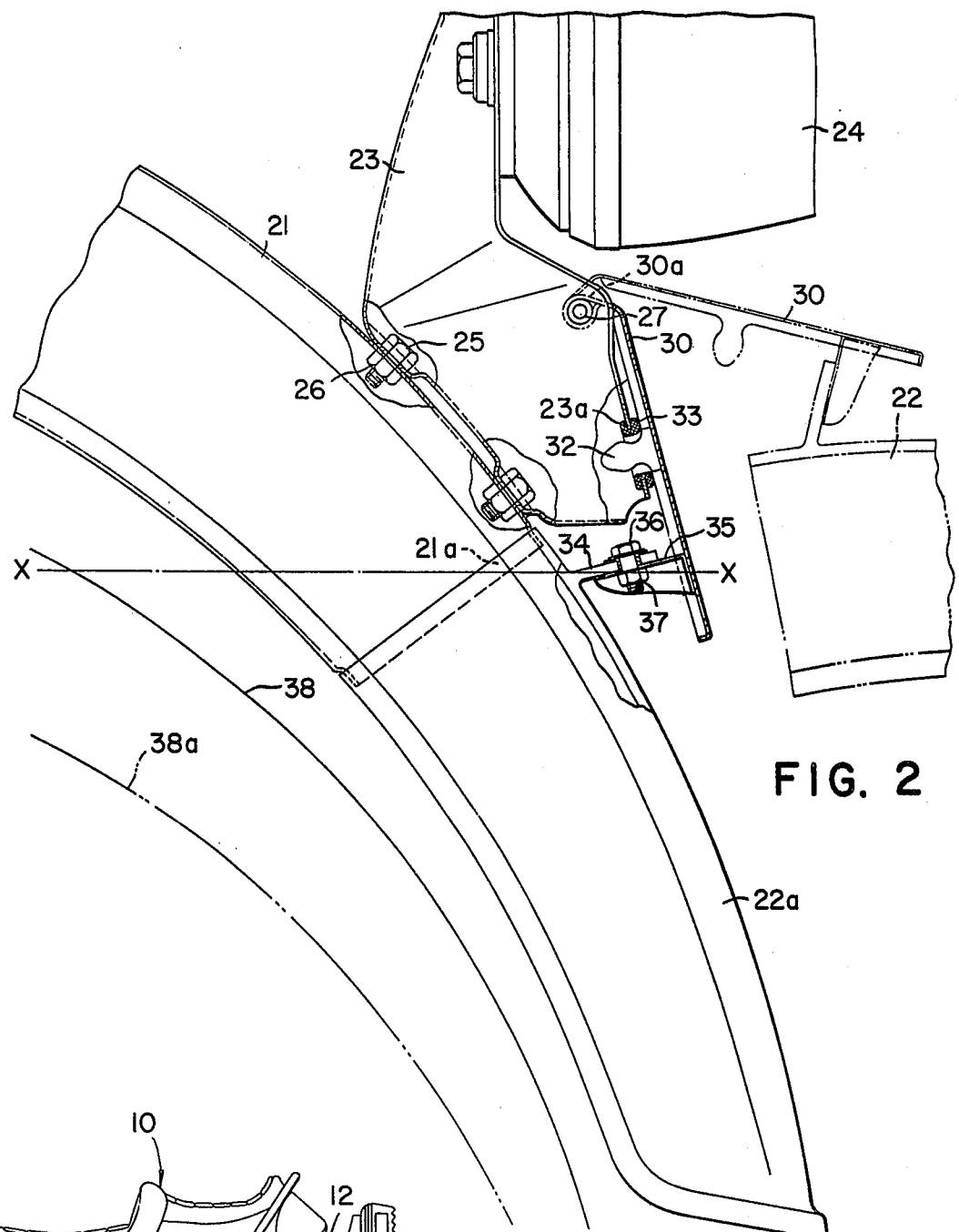
FIG. 2 is a side elevation view showing partially in longitudinal section one embodiment of a rear fender structure for a motorcycle according to the present invention.
Figure 1:
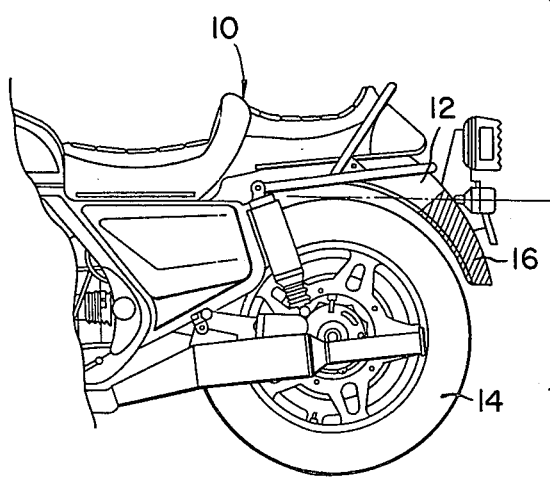
FIG. 1 is a side elevation view showing the rear fender of a motorcycle according to the prior art.
Figure 3:
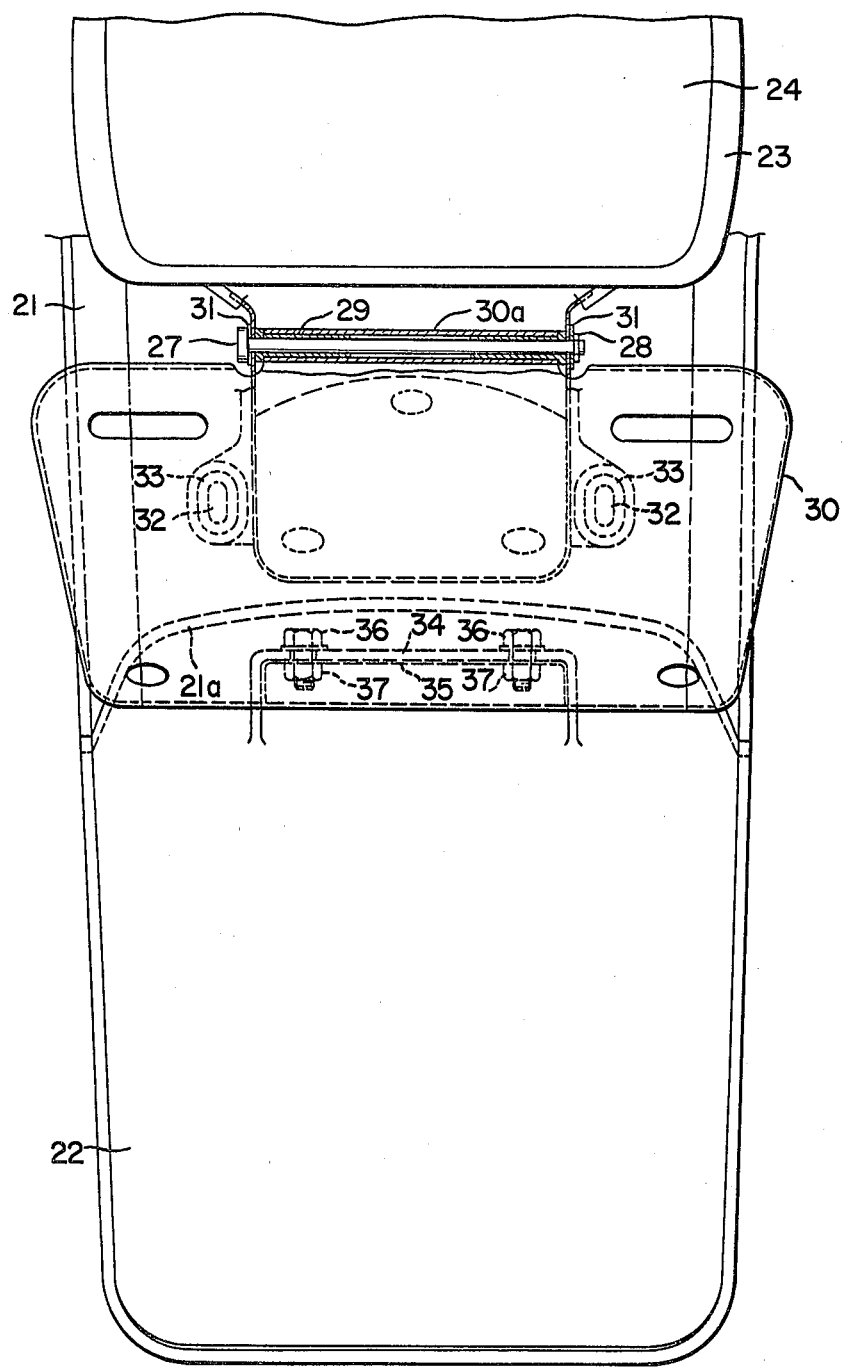
FIG. 3 is a rear elevation view of the rear fender structure of FIG. 2.

With reference to FIGS. 2 and 3, a fender body 21 is fixedly attached to the motorcycle body or frame (not shown). A lower end 21a of the fender body 21 is constructed to have its widthwise center portion positioned above the level X—X of the uppermost outer circumference of the motorcycle rear tire 38 when the rear tire requires replacement. The lower end 21a of the fender body is stepwise drawn inwardly. A fender member 22 is so shaped and sized that it can be removably attached to the stepped lower end 21a of the fender body 21.

The fender body 21 is made of steel whereas the fender member 22 is made of a synthetic resin such as polyethylene or polypropylene. The fender body 21 and the fender member 22 can be made of other suitable materials. The rear fender comprises the fender body 21 and the fender member 22.

A tail light bracket 23 is detachably attached by means of bolts 25 and nuts 26 to the fender body 21. The tail light 24 is removably mounted to the tail light bracket 23.

A pin 27, on which are mounted two washers 31, extends through the tail light bracket 23 and is maintained in position by a check pin 28. A license plate holder 30 has an upper end sleeve portion 30a, fitted on the pin 27 through a bush 29 of nylon so that the license plate holder 30 can swing up and down.

Nails 32 are formed to integrally extend at a right angle from both sides of the back of the license plate holder 30. Grommets 33 made of an elastic material such as rubber are fitted in holes 23a of the tail light bracket. The holes 23a with grommets 33 therein are positioned to receive the nails 32.

When the license plate holder 30 is held at a normal lower set position as shown by solid lines in FIG. 2, the nails 32 snugly fit into the corresponding grommets 33 so that the license plate holder 30 is firmly held in position by the frictional force between the nails 32 and the grommets 33.

A stay 34 protrudes backwardly from the upper portion of the outer side of the fender member 22, and a mounting bracket 35 is integrally fixed to the lower portion of the back of the license plate holder 30. When the license plate holder 30 depends to its normal lower set position, the stay 34 is integrally attached to the mounting bracket 35 by means of bolts 36 and nuts 37. The upper edge of the fender member 22 is tightly fitted in the stepped lower end 21a of the fender body 21. The attachment of the fender member 22 to the license plate holder 30 and its attachment in turn to the tail light bracket 23 makes the assembly of the tail light bracket 23 and the license plate holder 30 a hinged mount for the fender member 22, the license plate holder 30 being a hinged member in conjunction with the fixed tail light bracket 23.

A rear tire 38 is supported on its axle (not shown) by a rear fork (not shown). The outer circumference of the tire when it needs to be replaced is shown by a double-dotted line 38a in FIG. 2. The uppermost outer circumference of the rear tire when it is to be replaced is shown by line X—X shown in FIG. 2.

To replace a tire with the fender structure shown in FIGS. 2 and 3, an obliquely upper force is applied to the license plate holder 30. This causes the nails 32 to be released from the grommets 33 so that the license plate holder 30 and the fender member 22 are swung together obliquely upwardly on the pin 27 until they reach the position shown by double-dotted lines in FIG. 2. As a result, even if the uppermost outer circumference of the rear tire 38 to be replaced is at the elevation of line X—X, the fender member 22 providing the lower portion of the rear fender can be brought to a position above the level X—X so that the attaching or detaching of the rear tire 38 can be accomplished easily in a short amount of time.

After the tire has been replaced, the license plate holder 30 is swung down until the nails 32 come into the grommets 33. Then the license plate holder 30 can be returned to a desired set position, and the upper end of the fender member 22 can be joined to the stepped lower end of the fender body 21.

An advantage of the present invention is that the attachment and detachment of the fender member 22 can be performed quickly. This is because the attachment and detachment can be effected merely by releasing the nails 32 of the license plate holder 30 in and from the grommets 33.

Another advantage of the present invention is that the mounting bracket 35 is integrated with the lower portion of the back of the license plate holder 30. This minimizes the number of parts used for the novel design.

Although in the version shown in FIGS. 2 and 3 the fender member 22 is set in its lower position by fitting the nails 32 into the grommets 33, the license plate holder 30 can be fixed by fastening means such as wedges, cotter pins, or screws instead of frictionally holding the nails 32 in the grommets 33.

Figure 4:
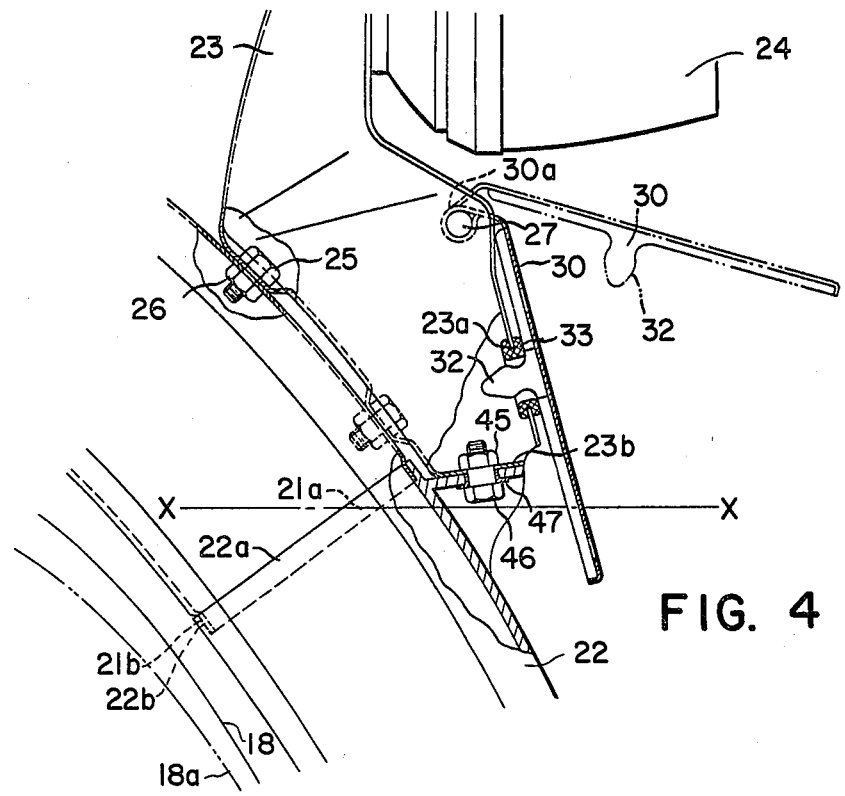
FIG. 4 is a side elevation view showing partially in longitudinal section another embodiment of the rear fender structure for a motorcycle according to the present invention.
Figure 5:
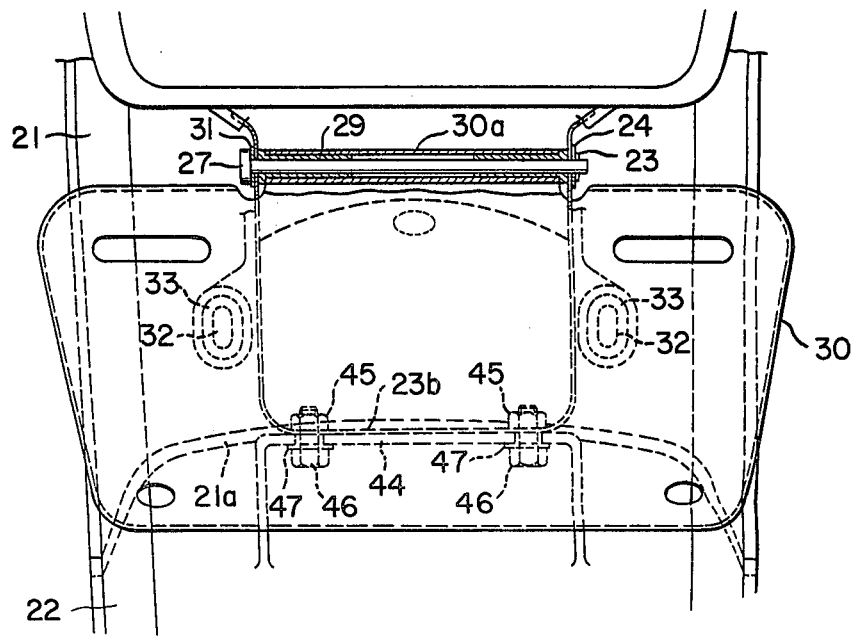
FIG. 5 is a rear elevation view of the rear fender structure of FIG. 4.

FIGS. 4 and 5 show another version of the present invention. Elements of the structure shown in FIGS. 4 and 5 which are the same as corresponding elements of the structure shown in FIGS. 2 and 3 have the same reference numbers. The version of FIGS. 4 and 5 differs from version of FIGS. 2 and 3 in that a stay 44 protrudes backwardly from the upper portion of the outer side of the fender member 22 and is detachably attached to the lower horizontal member 23b of the tail light bracket 23 by means of bolts 46 which are fastened through collars 47 and nuts 45. The nuts 45 are integrally fixed and attached to the lower horizontal member 23b of the tail light bracket 23 by welding.

To remove the rear tire from the motorcycle in the version of FIGS. 4 and 5, an obliquely upper force is applied to the license plate holder 30. Then the nails 32 are released from the grommets 33 so that the license plate holder 30 is swung obliquely upward, pivoting on the pin 27, until the license plate holder 30 reaches a position shown by double-dotted lines in FIG. 4. As a result, the bolts 46 are no longer hidden by the license plate holder 30, and become accessible. Thus, the fender member 22 can be removed from the fender body 21 by loosening the bolts 46.

In the embodiment shown in FIGS. 4 and 5, the upper end portion 22a of the fender member 22 is fitted on the stepped lower end 21a of the fender body 21. It is possible to more firmly fix the fender member 22 to the fender body 21 by forming the stepped lower end 21a of the fender body 21 and the upper end portion 22a of the fender member 22 with a projection or click at either the right or left side ends 21b and 22b. The remainder of the stepped lower end 21a of the fender body 21 and upper end portion 22a of the fender member 22 can be formed with an engagement portion such as a recess which can engage with the projection or click.

In summary, a fender structure according to the present invention can have, as shown in the version of FIGS. 2 and 3, a fender member which is detachably attached to the fender body which is fixed to the motorcycle body or frame. The fender member is hingedly connected through a mounting bracket to fixing means such as a tail light bracket. Upon replacement of the rear tire, the upward swing of the fender member through the mounting bracket relative to the fixing means can allow the rear tire to be easily detached and attached without raising or leaning the motorcycle frame, even if the lower end of the rear fender extends a long distance downwardly. Thus, the replacement of the rear tire can be accomplished efficiently within a short time.

In the version of FIGS. 4 and 5, the fender member is removably joined to the fender body and is detachably attached to the tail light bracket. Upon replacement of the rear tire, the attachment and detachment of the fender member to and from the tail light bracket can allow the rear tire to be easily attached and detached without raising or leaning of the motorcycle body, even if the lower end of the rear fender extends a long distance downwardly.

What is claimed is:

1. A rear fender structure for a motorcycle, comprising
    a fender body;
    a hinged mount fixed to said fender body and extending rearwardly from said fender body to include a hinge displaced from said fender body and a hinged member;
    a fender member fixed to said hinged member, said fender member forming a retractable extension of said fender body.

2. The rear fender structure of claim 1 wherein said hinged mount includes a tail light bracket rigidly fixed to said fender body and said hinged member being a license plate bracket.

3. The rear fender structure of claim 1 wherein said hinged mount further includes a snap lock to fix said hinged member relative to said fender body.

4. A rear fender structure for a motorcycle, comprising
    a fender body;
    a hinged mount fixed to said fender body and including a fixed member extending rearwardly from said fender body, a hinge displaced from said fender body on said fixed member and a hinged member attached to said fixed member by said hinge;
    a fender member fixed to said hinged member, said fender member forming a retractable extension of said fender body.

5. The rear fender structure of claim 4 wherein said hinged mount further includes a snap lock for selectively fixing said fixed member and said hinged member together.

6. The rear fender structure of claim 4 wherein said fixed member is a tail light bracket and said hinged member is a license plate bracket.

* * * * *